United States Patent [19]

Kahn et al.

[11] 4,421,778

[45] Dec. 20, 1983

[54] FREEZER STABLE WHIPPED ICE CREAM AND MILK SHAKE FOOD PRODUCTS

[75] Inventors: Marvin L. Kahn, Williamsville; Robert J. Lynch, Buffalo, both of N.Y.

[73] Assignee: Rich Products Corporation, Buffalo, N.Y.

[21] Appl. No.: 439,129

[22] Filed: Nov. 4, 1982

[51] Int. Cl.$^3$ ............................ A23G 9/02; A23G 9/04
[52] U.S. Cl. ...................................... 426/564; 426/565; 426/580; 426/585
[58] Field of Search ............... 426/565, 566, 567, 564, 426/580, 584, 585

[56] References Cited

U.S. PATENT DOCUMENTS

| | | | |
|---|---|---|---|
| 3,914,440 | 10/1975 | Witzig | 426/565 |
| 3,949,102 | 4/1976 | Hellyer | 426/565 |
| 4,031,261 | 6/1977 | Durst | 426/565 |
| 4,146,652 | 3/1979 | Kahn et al. | 426/565 |

*Primary Examiner*—Jeanette M. Hunter

[57] ABSTRACT

A whipped ice cream or milk shake which maintains stable volume when stored at refrigerator or freezer temperatures, is non crystalline and spoonable at about 0° F. and is an oil-in water emulsion of nonfat milk solids, 40% to about 75% water, sugar in a ratio to water of about 1:1.75 to about 3.0, the sugar being at least about 30% fructose and/or dextrose; and about 3 to about 10% fat wherein at least 50% of the fat is a sold beta phase-tending crystalline fat, flavoring, emulsifiers and stabilizers of microcrystalline cellulose and sodium carboxy methylcellulose.

37 Claims, No Drawings

FREEZER STABLE WHIPPED ICE CREAM AND MILK SHAKE FOOD PRODUCTS

BACKGROUND OF THE INVENTION

Milk shakes are comprised of aqueous emulsions which are foamed by being whipped with air. When a conventional milk shake product is stored in a container at refrigerator temperatures, the foam rapidly collapses, and the result is a substantial loss in the volume of the product during storage. Thus, conventional milk shakes such as those sold by fast-food restaurants must be consumed shortly after they are prepared and cannot be stored at refrigerator temperatures for longer than about one hour. At freezer temperatures such shake products freeze solid and require a lengthy thawing period before they can be consumed with either a spoon or a straw.

Frozen foods such as frozen vegetables, etc. are stored in supermarket freezers at about 0° F. However, ice creams are conventionally stored in supermarket freezers at temperatures of about −20° F., since at freezer temperatures of about 0° F., a substantial loss of product volume is typically observed after less than about a one-month storage period. Moreover, when stored at about 0° F., conventional ice cream products tend to become crystalline and grainy. From an energy consumption standpoint, the requirement of −20° F. storage temperature for ice cream products is economically disadvantageous.

It is an object of this invention to provide whipped ice cream and milk shake products which maintain a stable volume when stored for prolonged periods at refrigerator temperatures, as well as at the economically advantageous freezer storage temperature of about 0° F. It is also an object of this invention to provide whipped products which remain in a substantially noncrystalline and spoonable state at freezer temperatures of about 0° F. and, therefore, do not require a prolonged thawing period prior to consumption.

Other objects and advantages of this invention will be apparent from the description of this invention which follows.

BRIEF DESCRIPTION OF THE INVENTION

The whipped products of this invention can be stored at freezer temperatures of about 0° F. for at least about 6 months, and preferably for at least about one year, substantially free from losses in the volume of the product. At freezer temperatures of about 0° F., the whipped milk shake and ice cream products of this invention are in a lightly firm, substantially noncrystalline, and spoonable condition. At about 0° F. the whipped product resembles fancy quality fresh-made ice cream. When served at about 0° F. to about 15° F., the product is soft, easily spoonable and resembles creamy soft-serve ice cream.

At about 15° F. to about 32° F., the consistency of the product resembles a conventional thick shake product, such as those sold by fast-food restaurants. The whipped milk shake and ice cream products of this invention may be stored substantially free from loss of product volume at refrigerator temperatures of about 32° F. to about 42° F. for at least about 5 days, and preferably for at least about 10 days. The product is in a strawable state at refrigerator temperatures and, therefore, can be removed from the refrigerator and immediately consumed through a straw.

This invention provides a whipped food product comprised of an oil-in-water emulsion of nonfat milk solids, and about 40% to about 70% water, and sugar in a ratio to water of about 1:1.75 to about 3.0, the sugar being comprised of at least about 30% fructose and/or dextrose; and about 3% to about 10% fat, wherein at least about 50% of the fat is comprised of a solid beta phase-tending crystalline fat, and minor effective amounts of flavoring, emulsifier, and stabilizers comprised of microcrystalline cellulose and sodium carboxymethylcellulose. The product is substantially noncrystalline and spoonable at about 0° F., and the volume of the product remains substantially constant during storage at about 0° F. for at least about six months, and preferably for at least about one year.

The invention also relates to a whippable food product comprised of an oil-in-water emulsion of nonfat milk solids, and about 40% to about 70% water, and sugar in a ratio to water of about 1:1.75 to about 3.0, the sugar being comprised of at least about 30% fructose and/or dextrose; and about 3% to about 10% fat, wherein at least about 50% of the fat is comprised of a solid beta phase-tending crystalline fat, and minor effective amounts of flavoring, emulsifier, and stabilizers comprised of microcrystalline cellulose and sodium carboxymethylcellulose. When whipped, the product is substantially noncrystalline and spoonable at about 0° F., wherein the volume of the whipped product remains substantially constant during storage at about 0° F. for at least about six months, and preferably for at least about one year.

A premix for use in preparing whipped food products is also provided by this invention which comprises: about 3.5% to about 20% of an emulsifier, about 6% to about 34% of a stabilizer comprised of microcrystalline cellulose and sodium carboxymethylcellulose, and about 10% to about 30% of a solid beta phase-tending crystalline fat, and a protein or carbohydrate carrier for the foregoing ingredients.

The present invention also provides novel methods for preparing whipped food products including milk shakes and ice cream having the desirable freezer and refrigerator storage properties mentioned above.

DETAILED DESCRIPTION OF THE INVENTION

The whipped products of this invention may be prepared from a premix comprised of an emulsifier, stabilizer and a beta phase-tending crystalline fat. The premix may be comprised of about 10% to about 30%, and preferably about 13% to about 17% of a beta phase-tending crystalline fat, about 3.5% to about 20% emulsifier, preferably about 5% to about 15% emulsifier, and about 6% to about 34%, and preferably about 13% to about 28% of a stabilizer. The balance of the premix may be comprised of a protein or carbohydrate carrier for the components of the premix.

Throughout this application all amounts are by weight unless expressly stated otherwise. In addition, percentages are on a total formulation basis unless another basis is specified.

Any beta phase-tending crystalline fat which is a solid at room temperature may be employed as the fat component of the premix, and preferably those saturated or partially hydrogenated beta phase-tending crystalline fats having a melting point of about 85° F. to about 120°

F., and preferably 90° F. to 105° F. Suitable beta phase-tending crystalline fats include the lauric fats, coconut oil, palm kernel oil, babassu oil, palm oil, butter fat, etc.

Since the whipped products of this invention are oil-in-water emulsions, an emulsifier is a necessary component of the premix, as well as the final whipped product. Emulsifiers promote the formation of a stable dispersion of fat in the aqueous phase of the product, and also enhance the rate of aeration, and total aeration obtained. Any one of a number of emulsifiers may be employed including: hydroxylated lecithin, mono, di, or polyglycerides of fatty acids, such as monostearin and monopalmitin; polyoxyethylene ethers of fatty esters of polyhydric alcohols, such as the polyoxyethylene ethers of sorbitan monostearate (polysorbate 60 or 80) or the polyoxyethylene ethers of sorbitan distearate; fatty esters of polyhydric alcohols such as sorbitan monostearate; mono- and di-esters of glycols such as propylene glycol monostearate, and propylene glycol monopalmitate, succinoylated monoglycerides; sodium or calcium stearoyl-2-lactylate; and the esters of carboxylic acid such as lactic, citric, and tartaric acids with the mono- and diglycerides of fatty acids such as glycerol lactopalmitate and glycerol lactostearate. The fatty acids employed in the preparation of the emulsifiers include those derived from beef, tallow, and coconut, cotton seed, palm, peanut, soybean and marine oils. Many blends of emulsifiers are commercially used and readily available in accordance with known techniques. For example, it may be desirable to provide a controlled hydrophile-lipophile balance (HLB) as with a lipophilic emulsifier such as glyceryl monostearate or sorbitan monostearate with a hydrophilic material, such as polysorbate 80.

The stabilizer component is comprised of a mixture of a microcrystalline cellulose in the amount of about 5% to about 25%, and preferably about 10% to about 20% by weight of the premix, with sodium carboxymethylcellulose (CMC) in the amount of about 1% to about 7%, and preferably about 2.5% to about 6.0% of the premix. It is believed that the use of a microcrystalline cellulose stabilizer in combination with a beta phase-tending crystalline fat enhances the refrigerator and freezer stability of a whipped product prepared from the premix and, further, that the CMC is of substantial aid in stabilizing the emulsion against separation under freezer and refrigerator conditions.

In order to enhance the body of the whipped product, and to aid in maintaining flavorants in suspension, a third stabilizer, and preferably calcium carrogeenan or sodium alginate may be employed in the premix in the amount of about 0.30% to about 2.0%, and preferably about 0.5% to about 1.5% of the premix.

Any of a number of solid protein or carbohydrate additives, preferred to herein as "carriers," may be included in the premix in the amount of about 20% to about 80%, preferably about 46% to about 66%. Suitable carriers include dairy whey, whey protein concentrate, flavorants such as cocoa, sugars such as dextrose, granulated sugars, maltodextrins, corn syrup solids (preferably of about 10 to about 20 D.E.), or nonfat milk solids. These additives function as carriers for the beta phase-tending crystalline fat and the other components of the premix, and also aid in preventing the premix from absorbing water and solidifying during storage. When dairy whey is employed as the carrier, it is preferred to employ about 40% to about 60% of this ingredient in the premix.

The premix may be prepared by first dry blending the solid emulsifier, stabilizer and carriers, in the desired ratios. The blending of the solid ingredients of the mix is preferably performed in a ribbon blender or another blender suitable for blending powders. The fat is heated until it is completely liquid, and is poured slowly or sprayed into the blender so that the powder components of the premix are encapsulated by the fat. The resultant premix product has a cornmeal-like texture.

The premix is suitable for use in the preparation of ice cream and shake products, of both the part-dairy and all-dairy types. For example, the premix may be mixed with water, flavoring, vegetable oil, sugar, and nonfat milk solids, to provide a part-dairy shake or ice cream product; or the premix may be blended with water, flavoring, butter fat, sugar and nonfat milk solids, to provide an all-dairy shake or ice cream product. About 2.5% to about 4.0%, preferably about 3.0%, by weight of the premix may also be employed to prepare a shake or ice cream product which is in the form of an oil-in-water emulsion comprised of about 40% to about 70% water, preferably about 50% to about 65% water; sugar in a ratio to water of about 1 to about 1.75–3.0, preferably about 1 part sugar to about 2.5 parts water, about 3% to about 10% fat, preferably about 4% to about 7% fat; about 0.125% to about 1.0% microcrystalline cellulose stabilizer, about 0.025% to about 0.28% CMC stabilizer, nonfat milk solids and effective amounts of an emulsifier and flavoring. The total protein solids content of the formulation may be about 3% to about 10% or higher, and may be supplied by the nonfat milk solids, whey or other protein additives to the formulation. At least about 50% of the fat should be comprised of beta phasetending crystalline fat of the type described above, while the balance of the fat may be comprised of any of a number of polyunsaturated fats. The formulation may also include about 0.008% to about 0.06% carrageenan or sodium alginate.

A dairy ice cream or shake product is prepared by employing butter fat in the fat component of the formulation. A part-dairy product is provided by excluding butter fat from the formulation and employing vegetable oils as the fat component, in combination with the nonfat milk solids component. In the all-dairy ice creams and shakes, the beta fat component may be comprised entirely of butter fat.

The sugar component of the formulation is comprised of at least about 30% fructose and/or dextrose, and preferably about 35% to about 50% fructose and/or dextrose. The sugar component of the product may be comprised of a blend of about a 27 to 75 D.E. corn syrup, a fructose-dextrose syrup, and sucrose, in proportions sufficient to provide at least about 30% fructose and/or dextrose in the sugar component. Whipped products may be prepared containing about 10% to about 13% of a high fructose-dextrose syrup, about 7% to about 10% sucrose, and about 1.5% to about 4.0% of about a 27 to about 75 D.E. corn syrup.

A fructose-dextrose syrup suitable for use herein is Isosweet 100, comprised of 29% water and 71% sugars (50% dextrose, 42% fructose, 1.5% maltose, and 5% higher saccharides). A useful high fructose-dextrose syrup comprises 23.5% water and the remainder 55% fructose and 45% dextrose. A fructose concentrate suitable for use herein is an aqueous syrup having 80% sugar of which 90% is fructose and 10% is dextrose.

The corn syrup employed may have a water content of about 22.5%, and a D.E. of about 29, and may be comprised of 8.4% dextrose, 14.6% maltose, 8.6% trisaccharides, and 68.4% tetrasaccharides and higher, sold under the trade name Amaizo Lodex C Corn Syrup by American Maize Products Co., New York, N.Y.

Any of a number of sugars may be employed in combination with the fructose or dextrose component of the formulation. Useful sugars include the mono-saccharides, di-saccharides and polysaccharides and their degradation products: e.g., pentoses, including aldopentoses, methylpentoses, ketopentoses, like xylose and arabinose, a deoxyaldose like rhamnose, hexoses and reducing saccharides such as aldo hexoses like galactose and mannose; and ketohexoses, for example, sorbose; disaccharides, like lactose and maltose; non-reducing disaccharides such as sucrose and other polysaccharides such as dextrin and raffinose; and hydrolyzed starches which contain as their contituents oligosaccharides. Typically, the commercially available mixtures of invert sugars are used which contain dextrose and levulose, as well as maltose and corn syrup solids.

Fats high in unsaturation suitable for use in the formulation are safflower oil, corn oil, soybean oil, cottonseed oil and sunflower oil—unsaturated fats as used in this specification are those having an iodine value of about at least 50 which include partially hydrogenated fats, and the more highly unsaturated fats with an iodine value of about 100. It is believed that the use of an unsaturated fat, in the amount of about 50% by weight of the fat content, helps keep the product spoonable at freezer temperatures, and enhances the mouth-feel of the formulation.

Other ingredients known to those skilled in the art may also be employed to impart their characteristic effects to the compositions of the present invention. Typical of such ingredients are flavoring agents, colorants, vitamins, minerals and the like. Suitable flavoring agents can be employed to impart vanilla, strawberry, cream, chocolate, coffee, maple, spice, mint, butter, caramel, fruit, cocoa and other flavors. Additionally, the use of certain polyols such as sorbitol and mannitol can be employed to modify mouth-feel. Furthermore, other additives such as phosphates and the like may be employed for their known functions. Several types of ingredients used are described below.

Protein concentrates and isolates are useful to improve the nutritional qualities of the product and to facilitate and maintain a whipped structure. Protein also aids in emulsification and contributes to flavor. Bland protein concentrates with a wide range of fiber content, bland soy flour, milk powder and food proteins are all useful, generally in concentrations from about 0-10%, preferably from about 0.3-3%. Alternatively, use can be made of a protein such as sodium or calcium caseinate which is conventional in whipped toppings, or as its substitute a protein hydrolysate in a minor amount.

The mouth-feel, texture and/or viscosity of the product may be adjusted as desired by the addition of gums such as xanthum gum, guar gum, locust bean gum, gum tragacanth and gum arabic. Gums may be employed in the amount of about 0.01% to to about 0.5% by weight of the composition. Starches and/or modified starches, and dextrin may also be employed to aid in the adjustment of mouth-feel and viscosity in the amount of about 0.5% to about 3%. For example, about 2% by weight of equal amounts of a mixture of National Starch Dextrin K4484 and Instant Cleargel Pregelatinized Starch may be employed in whipped products.

The whipped product may be prepared from the premix by first blending the sugar component of the formulation with water at high shear and at pasteurizing temperatures of about 170° F. The premix, nonfat milk solids, and all nonfat components of the formulation are then added to the sugar solution, and the resultant mixture is blended at high shear and at pasteurizing temperatures until a solution is formed. At this point the balance of the fat components may be added, and the mixture is blended.

When the product is not prepared from a premix, it is prepared by first blending the sugar component of the formulation with water at high shear, and at pasteurizing temperatures of about 170° F. At this point all nonfat components of the formulation are added to the sugar solution and the resultant mixture is blended at high shear and at pasteurizing temperatures until a solution is formed. The fat component is then added to the solution, and blended with the other ingredients.

The blended ingredients are then passed through an homogenizer of the typical dairy type. Although homogenization may be accomplished in one stage, it is carried out in two stages for best results. Preferably, the pressure during the first stage is maintained at a minimum of about 300 psi and a maximum of about 1,000 psi, most preferably about 500 psi, and the pressure during the second stage is maintained at about 2,000 to about 10,000 psi, preferably about 3,000 psi. The mix is usually maintained at a temperature of from about 60° C. to about 75° C., during homogenization. After homogenization the product is directly cooled by passage through a heat exchanger (i.e., a plate cooler or votator), until a product temperature of about 2° C. to about 8° C. is reached.

Prior to whipping the mix is preferably held at about 5° C. to about 8° C. for about 4 to about 24 hours. The mix is then whipped by passing it through a milk shake or ice cream freezer such as those conventionally employed in the dairy industry. The product exits the freezer in a whipped state at a temperature of about 20° C. to about 24° C. The blend may be whipped to an overrun of about 70% to about 130%. However, for a shake product the overrun is preferably about 60% to about 100%. For a soft-serve ice cream, the overrun is preferably about 90% to about 130%. Overrun refers to the weight of the unwhipped product minus the weight of the whipped product divided by the weight of the unwhipped product times 100, for a constant volume of product.

The following examples are not intended to be limiting but rather illustrative of some approaches taken and, of course, may be varied in accordance with the spirit and scope of the invention.

EXAMPLE 1

A non-dairy chocolate shake formulation is prepared as follows:

| Ingredient | Amount (%) |
|---|---|
| 1. Nonfat dry milk | 6.00 |
| 2. Whey concentrate | 5.00 |
| 3. Isosweet 100 | 12.00 |
| 4. Sucrose | 9.00 |
| 5. 36 D.E. corn syrup | 3.00 |
| 6. Seakem C | .02 |
| 7. Avicel CL-611 | .45 |
| 8. CMC-7HOF | .10 |
| 9. Water | 55.96 |

| Ingredient | Amount (%) |
|---|---|
| 10. D-23-A | 1.75 |
| 11. Ice II | .20 |
| 12. Soybean Oil | 3.00 |
| 13. Coconut Oil | 3.00 |
| 14. Premium Overtone Vanilla | .50 |

Seakem C, employed in the formula, is a refined calcium carrageenan, available from Marine Colloids, Inc., Walnut Creek, Calif. It is comprised of 3,6-anhydro-d-galactose and sulfated d-galactose residues linked together to form long chain polymers having molecular weights of several hundred thousand. The ester sulfate group of carrageenan expressed as $SO_4^{--}$ is approximately 25% by weight of the product.

Avicel CL-611 employed in the formulation is a microcrystalline cellulose containing a small amount of CMC, commercially available from FMC Corporation, Philadelphia, Pa.

CMC-7HOF is a purified sodium carboxymethylcellulose gum, sold by Hercules Co.

D-23-A in the above formulation is a Dutch cocoa comprised of about 23% cocoa fat, sold by Dezaan Co.

Ice II is an emulsifier comprised of 20% polysorbate 80, and 80% mono and diglycerides (glycerol monostearate).

The procedure for making the product is as follows.

The Isosweet (3), corn syrup (5) and flavoring (14) were added to water (9) and mixed under high shear conditions at about 160° F. Component (11) was then added and dissolved, followed by the addition of components (1), (2), (6), (7), (8), (10) and a portion of component (4). The foregoing components were mixed under high shear and at pasteurizing temperatures until dissolved, and then the balance of component (4) was added. Next, the fat components (12) and (13) were added to the solution, the mixture was heated to 160° F., and homogenized in two steps, first at 500 psi and then at 3,000 psi. The product was directly cooled in a heat exchanger until the product reached a temperature of about 2° C. to about 8° C. The product was placed in a suitable container and stored for about 18 hours, at temperatures of 5° C. The product was then whipped to an overrun of about 85%, and stored in a refrigerator for 10 days.

The product was examined at the end of the 10-day period and was found to have retained its initial volume, and could be readily poured from its container. No separation was observed in the emulsion which was uniform and homogeneous.

EXAMPLE 2

A chocolate dairy shake was prepared from the following ingredients:

| Ingredient | Amount (%) |
|---|---|
| 1. nonfat dry milk | 6.00 |
| 2. Whey concentrate | 5.00 |
| 3. Isosweet 100 | 12.00 |
| 4. Sucrose | 9.00 |
| 5. 36 D.E. Corn Syrup | 3.00 |
| 6. Seakem C | .02 |
| 7. Avicel CL-611 | .45 |
| 8. CMC-7HOF | .10 |
| 9. Water | 54.57 |
| 10. D-23-A | 1.75 |
| 11. Ice II | .20 |
| 12. Butter | 7.41 (about 6% butter fat) |
| 13. Overtone Vanilla | .50 |

The procedure followed was the same as that for Example 1 except that ingredients (11) and (13) were added along with the butter to a solution of the other components. The product was whipped to about an 85% overrun.

EXAMPLE 3

Dextrose, dairy whey and whey protein containing premixes were prepared from the following ingredients:

| Ingredient | Dextrose Premix Amount (%) | Dairy Whey Premix Amount (%) | Whey Protein Concentrate Premix Amount (%) |
|---|---|---|---|
| 1. Seakem C | .67 | .67 | .67 |
| 2. Avicel Cl-611 | 15.00 | 15.00 | 15.00 |
| 3. CMC 7HOF | 3.30 | 3.30 | 3.30 |
| 4. Ice II | 6.70 | 6.70 | 6.70 |
| 5. Dairy Whey | — | 55.00 | — |
| 6. Dextrose | 55.00 | — | — |
| 7. Whey protein concentrate | — | — | 55.00 |
| 8. Palm kernel oil | 19.33 | 19.33 | 19.33 |

A dextrose premix, dairy whey premix and whey protein concentrate premix were prepared by dry blending the ingredients (1)–(4) and either ingredients (5), (6) or (7). The palm kernel was then melted and poured over and mixed with the dry blended ingredients. Dairy whipped products were prepared by combining the premixes with the following ingredients:

| Ingredient | Amount (%) |
|---|---|
| 1. sucrose | 9.00 |
| 2. nonfat dry milk | 7.50 |
| 3. whey concentrate | 3.35 |
| 4. Isosweet 100 | 12.00 |
| 5. D.E. corn syrup | 3.00 |
| 6. premix | 3.00 |
| 7. water | 54.24 |
| 8. overtone (vanilla) | .50 |
| 9. butter fat | 7.41 (about 6% butter fat) |

The dairy whipped product was prepared by adding the Isosweet 100 (4) to water (7), followed by the addition of the corn syrup (5) and vanilla flavor (8), under high shear and while the mixture was heated to about 160° F. The premix (6) was then added, mixed with the other ingredients until dissolved. The sucrose (1) and components (2) and (3) were then added to the other ingredients and mixed at high shear and pasteurizing temperatures until dissolved. The butter (9) was then added, the mixture was heated to about 165° F. and was homogenized in two steps, first at about 500 psi, and then at 3,000 psi, until a substantially homogeneous emulsion was formed. The product was cooled in a heat exchanger until the product temperature was about 2° C. to about 8° C. The product was then whipped and stored in a suitable container at about 41° F. for 5 days. The product volume remained constant for the five-day period, and the emulsion was acceptably stable with only trace amounts of separation noted for the products prepared from the dairy whey and whey protein concentrate premixes.

EXAMPLE 4

A portion of the product of each of Examples 1, 2 and 3 was placed in a freezer and stored for 12 weeks at about 0° F. The products were periodically removed from the freezer and examined over the test period. The volume of each of the products remained unchanged from its initial volume, and the products were spoonable and noncrystalline upon removal from the freezer.

This invention has been described in terms of specific embodiments set forth in detail, but it should be understood that these are by way of illustration and that the invention is not necessarily limited thereto. Modifications and variations will be apparent from the disclosure and may be restored to without departing from the spirit of this invention, as those of skill in the art will readily understand. Accordingly, such variations and modifications are considered to be within the purview and scope of this invention and the following claims.

What is claimed is:

1. A whipped food product comprised of an oil-in-water emulsion of nonfat milk solids, and about 40% to about 70% water, and sugar in a ratio to water of about 1:1.75 to about 3.0, said sugar being comprised of at least about 30% fructose and/or dextrose; and about 3% to about 10% fat, wherein at least about 50% of said fat is a solid beta phase-tending crystalline fat, and minor effective amounts of flavoring, emulsifier, and stabilizers comprised of microcrystalline cellulose and sodium carboxymethylcellulose, wherein the product is substantially noncrystalline and spoonable at about 0° F., and the volume of the product remains substantially constant during storage at about 0° F. for at least about six months.

2. The whipped food product according to claim 1 comprised of about 2% to about 7% of beta phase-tending crystalline fat, about 0.125% to about 1% microcrystalline cellulose, about 0.025% to about 0.28% sodium carboxymethylcellulose, a protein solids content in the product of about 3% to about 10%, and the volume of the product remains substantially constant during storage at about 0° F. for at least about one year.

3. The whipped food product according to claim 2 wherein said protein solids in said product are provided by nonfat milk solids, dairy whey, whey protein concentrate, or mixtures thereof.

4. The whipped food product according to claim 3 further comprising about 0.008% to about 0.06% carrageenan or sodium alginate.

5. The whipped food product according to claim 4 wherein the sugar is comprised of sucrose, corn syrup and a fructose-dextrose syrup.

6. The whipped food product according to claim 5 wherein the fructose-dextrose syrup comprises about 40% to about 90% fructose.

7. The whipped food product according to claim 6 wherein the fructose-dextrose syrup comprises about 29% water and about 71% of a sugar comprised of about 42% fructose and about 50% dextrose.

8. The whipped food product according to claim 2 wherein said beta phase-tending crystalline fat is butter fat, and the product is a dairy milk shake, which can be consumed through a straw when the shake is at a temperature of about 42° F., and wherein the volume of the product remains substantially constant during storage at refrigerator temperatures of about 42° F. for at least about 5 days.

9. The whipped food product according to claim 2 wherein said fat includes an unsaturated vegetable oil, the product is a part-dairy milk shake which can be consumed through a straw when the shake is at a temperature of about 42° F., and wherein the volume of the product remains substantially constant during storage at refrigerator temperatures of about 42° F. for at least about 5 days.

10. The whipped food product according to claim 8 wherein said flavoring is cocoa, strawberry or vanilla.

11. The whipped food product according to claim 9 wherein said flavoring is strawberry, cocoa or vanilla.

12. A whipped ice cream or milk shake product comprised of about 5% to about 8% nonfat milk solids, about 3% to about 6% whey concentrate, about 54% to about 62% water, and sugar in a ratio to water of about 1:1.75 to about 3.0, wherein said sugar component is comprised of at least about 30% fructose and/or dextrose; and minor effective amounts of flavoring, emulsifier, and stabilizers comprised of microcrystalline cellulose, sodium carboxymethylcellulose, and about 3% to about 7% fat wherein at least about 50% of said fat is a solid beta phase-tending crystalline fat, and wherein the product is spoonable and substantially noncrystalline at about 0° F., and the volume of the product remains substantially constant during storage at about 0° F. for at least about six months.

13. The whipped product according to claim 12 comprising a part-dairy shake wherein said fat includes an unsaturated vegetable oil, and the product comprises about 10% to about 13% of a fructose-dextrose syrup comprised of about 30% to about 90% fructose, about 7% to about 10% of sucrose, and about 1.5% to about 4% to about a 27 to about 75 D.E. corn syrup, about 0.05% to about 0.2% of sodium carboxymethylcellulose, about 0.35% to about 0.50% of microcrystalline cellulose, and the product further comprises calcium carrageenan or sodium alginate, wherein the volume of the product remains substantially constant for at least about 10 days at refrigerator temperatures of about 42° F. and for at least about one year at freezer temperatures of about 0° F.

14. The whipped product according to claim 13 wherein the flavoring is cocoa, strawberry or vanilla, and the product can be consumed through a straw when it is at a temperature of about 42° F.

15. The whipped product according to claim 12 wherein said beta phase-tending crystalline fat is butter fat, the product is a dairy shake, and comprises about 10% to about 13% of a fructose-dextrose syrup comprised of about 30% to about 90% fructose, about 7% to about 10% sucrose, about 1.5% to about 4% of about a 27 to about 75 D.E. corn syrup, about 0.05% to about 0.2% of sodium carboxymethylcellulose, and about 0.35% to about 0.50% of microcrystalline cellulose, and the product further comprises calcium carrageenan or sodium alginate, wherein the volume of the product remains substantially constant for at least about 10 days at refrigerator temperatures of about 42° F. and for at least about one year at freezer temperatures of about 0° F.

16. The whipped product according to claim 15 wherein the flavoring is strawberry, cocoa or vanilla, and the product can be consumed through a straw when it is at a temperature of about 42° F.

17. The whipped product according to claim 13 wherein said fat is comprised of about equal parts of soybean oil and coconut oil.

18. A whippable food product comprised of an oil-in-water emulsion of nonfat milk solids, and about 40% to about 70% water, and sugar in a ratio to water of about 1:1.75 to about 3.0, said sugar being comprised of at least about 30% fructose and/or dextrose; and about 3% to about 10% fat, wherein at least about 50% of said fat is a solid beta phase-tending crystalline fat, and minor effective amounts of flavoring, emulsifier, and stabilizers comprised of microcrystalline cellulose and sodium carboxymethylcellulose, and when whipped the product is substantially noncrystalline and spoonable at about 0° F., and the volume of the product when whipped remains substantially constant during storage at about 0° F. for at least about six months.

19. A whippable food product comprised of about 5% to about 8% nonfat milk solids, about 3% to about 6% whey, about 54% to about 62% water, and sugar in a ratio to water of about 1:1.75 to about 3.0, wherein said sugar component is comprised of at least about 30% fructose and/or dextrose; and minor effective amounts of flavoring, emulsifier, and stabilizers comprised of microcrystalline cellulose, sodium carboxymethylcellulose and calcium carrageenan; and about 4% to about 7% fat wherein said fat includes at least about 50% of a solid beta phase-tending crystalline fat and when the product is whipped, it is spoonable and noncrystalline at about 0° F., and the volume of the product when whipped remains substantially constant during storage at about 0° F. for at least about one year.

20. The whippable food product according to claim 19 wherein said fat is comprised of a solid beta phase-tending crystalline fat and an unsaturated vegetable oil, and said product comprises about 10% to about 13% of a fructose-dextrose syrup comprised of about 30% to about 90% fructose, about 7% to about 10% of sucrose, and about 1.5% to about 4% of about a 27 to about 75 D.E. corn syrup, and when whipped the volume of the product remains substantially constant for at least about 10 days at refrigerator temperatures of about 42° F.

21. The whippable food product according to claim 20 wherein the flavoring is cocoa, strawberry or vanilla.

22. The whippable food product according to claim 19 wherein said fat comprises butter fat and said product comprises about 10% to about 13% of a fructose-dextrose corn syrup comprised of about 40% to about 90% fructose, about 7% to about 10% sucrose, and about 1.5% to about 4% of about a 27 to about 75 D.E. corn syrup, and when whipped the volume of the product remains substantially constant for at least about 10 days at refrigerator temperatures of about 42° F.

23. The whippable food product according to claim 15 wherein the flavoring is strawberry, cocoa or vanilla.

24. The whippable food product according to claim 20 wherein said fat is comprised of about equal parts of soybean oil and coconut oil.

25. A premix for use in the preparation of whipped food products comprising about 3.5% to about 20% of an emulsifier, about 6% to about 34% of a stabilizer comprised of microcrystalline cellulose and sodium carboxymethylcellulose, and about 10% to about 30% of a solid beta crystalline fat, and a protein or carbohydrate carrier for the foregoing ingredients.

26. The premix according to claim 25 comprising about 20% to about 80% of a carrier selected from the group consisting of dairy whey, whey protein, cocoa and sugar, and mixtures thereof; said premix also including about 0.3% to about 2% of sodium alginate or calcium carrageenan.

27. The premix according to claim 26 comprising about 10% to about 20% microcrystalline cellulose, about 1% to about 7% sodium carboxymethylcellulose, and about 0.5% to about 1.5% of calcium carrageenan.

28. The premix according to claim 27 wherein the carrier is whey concentrate.

29. The premix according to claim 27 wherein the carrier is dextrose sugar.

30. The premix according to claim 27 wherein the carrier is dairy whey.

31. A method for preparing a whipped milk shake or ice cream product comprising:
a. mixing together about 3.5% to about 15% of an emulsifier, about 6% to about 34% of a stabilizer comprised of microcrystalline cellulose, sodium carboxymethylcellulose, and about 20% to about 80% of a protein or carbohydrate food stuff, and about 10% to about 80% by weight of a solid beta phase-tending crystalline fat, and then
b. blending the mixture with nonfat milk solids, sugar, water, flavoring and protein solids, and
c. cooling and whipping the resultant blend to provide a milk shake or ice cream product.

32. The method according to claim 31 wherein the milk shake or ice cream produt is prepared by forming an emulsion by blending a mixture comprised of about 3% to about 4% of the product of step (a) of claim 31 with nonfat milk solids, about 40% to about 70% water, sugar in a ratio to water of about 1:1.75 to about 3.0, said sugar being comprised of at least about 30% fructose and/or dextrose; and additional fat sufficient to bring the fat content of the mixture to about 3% to about 10%, wherein at least about 50% of the fat content of the product is a solid beta phase-tending crystalline fat, and then cooling and whipping the emulsion to provide a milk shake or ice cream product which is substantially noncrystalline and spoonable at about 0° F. and which remains substantially constant in volume during storage at about 0° F. for about six months.

33. The method according to claim 31 wherein a milk shake product is prepared by forming an emulsion by blending together a mixture of about 3% to about 6% whey, about 54% to about 62% water and sugar in a ratio to water of about 1:1.75 to about 3.0, wherein the sugar is comprised of at least about 30% fructose and/or dextrose, flavoring and about 5% to about 8% nonfat milk solids, about 3% to about 10% of a fat wherein at least about 50% of said fat is a solid beta phase-tending crystalline fat, and about 3% to about 4% of the product of step (a) of claim 31, and then cooling and whipping the emulsion to provide a milk shake or ice cream product which is spoonable and substantially noncrystalline at freezer temperatures of about 0° F., and which remains substantially constant in volume during storage at about 0° F. for at least about one year.

34. A method for preparing a whipped food product comprising:
a. mixing together nonfat milk solids, about 40% to about 70% water, and sugar in a ratio to water of about 1:1.75 to about 3.0, said sugar being comprised of at least about 30% fructose and/or dextrose; and about 3% to about 10% fat, wherein said fat is comprised of at least about 50% of a beta phase-tending crystalline fat, and minor effective amounts of flavoring, emulsifier and stabilizers comprised of microcrystalline cellulose and carboxymethylcellulose, and b. pasteurizing, homogenizing, and cooling the mixture, and then whipping the homogenized, pasteurized and cooled mixture to provide an ice cream or milk shake product which is substantially noncrystalline and spoonable at freezer temperatures of about 0° F., and which remains substantially constant in volume during storage at freezer temperatures of about 0° F. for at least about six months.

35. The method according to claim 34 which comprises making a milk shake product wherein said mixture includes calcium carrageenan, about 3% to about 7% beta phase-tending crystalline fat, about 0.125% to about 1% microcrystalline cellulose about 0.025% to about 0.28% sodium carboxymethylcellulose, and about 3% to about 10% protein solids, wherein the volume of the product remains substantially constant during storage at about 0° F. for at least about one year, and at about 42° F. for at least about 10 days.

36. The method according to claim 35 which comprises making a dairy milk shake wherein said beta phase-tending crystalline fat comprises butter fat.

37. The method according to claim 35 which comprises making a part-dairy shake, wherein said beta phase-tending crystalline fat comprises about equal parts of a beta phase-tending crystalline fat and a polyunsaturated vegetable oil.

* * * * *